O. KJELSTAD.
CAR LOADER.
APPLICATION FILED JULY 6, 1915.
1,265,673.
Patented May 7, 1918.
4 SHEETS—SHEET 1.
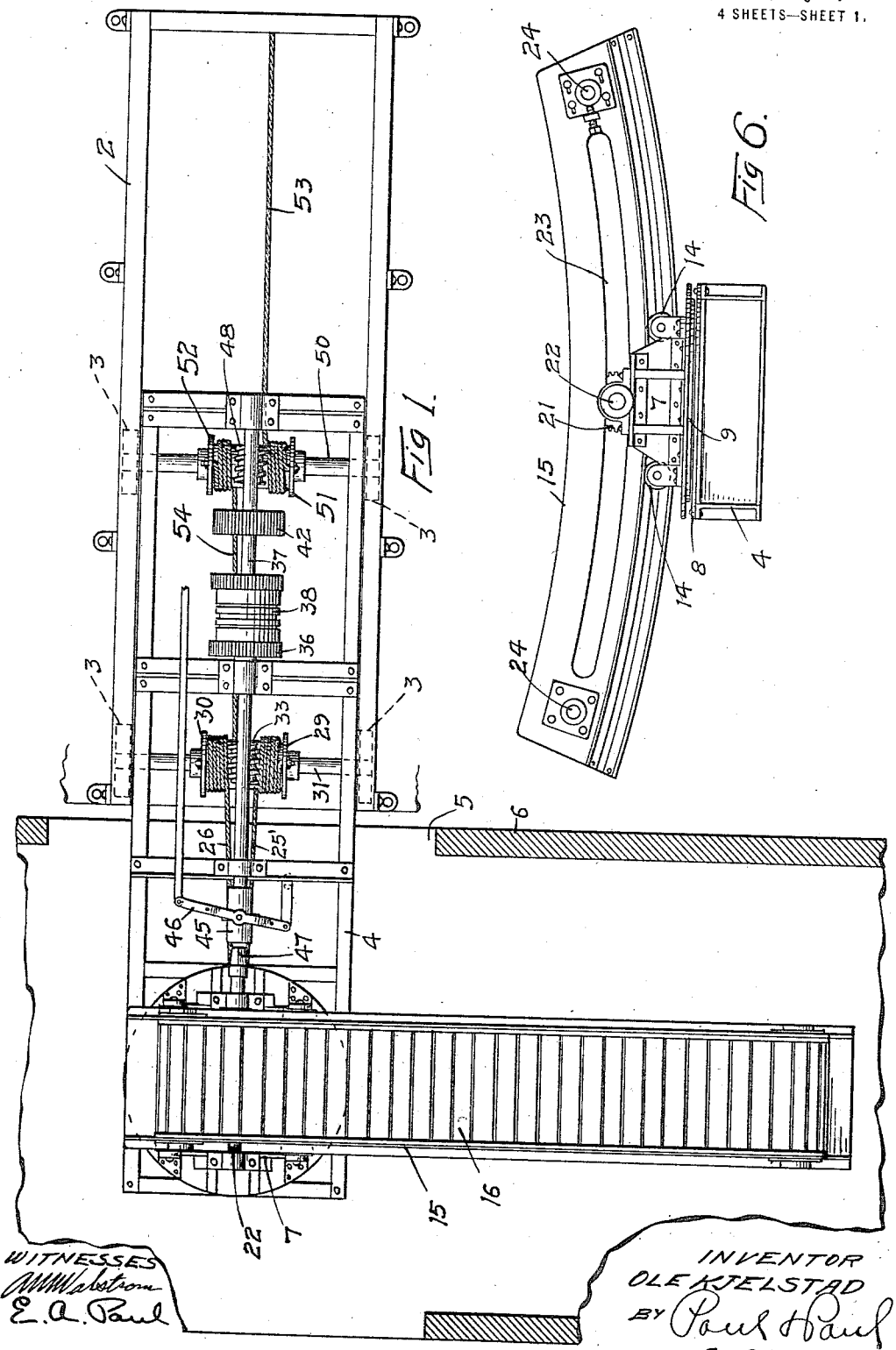

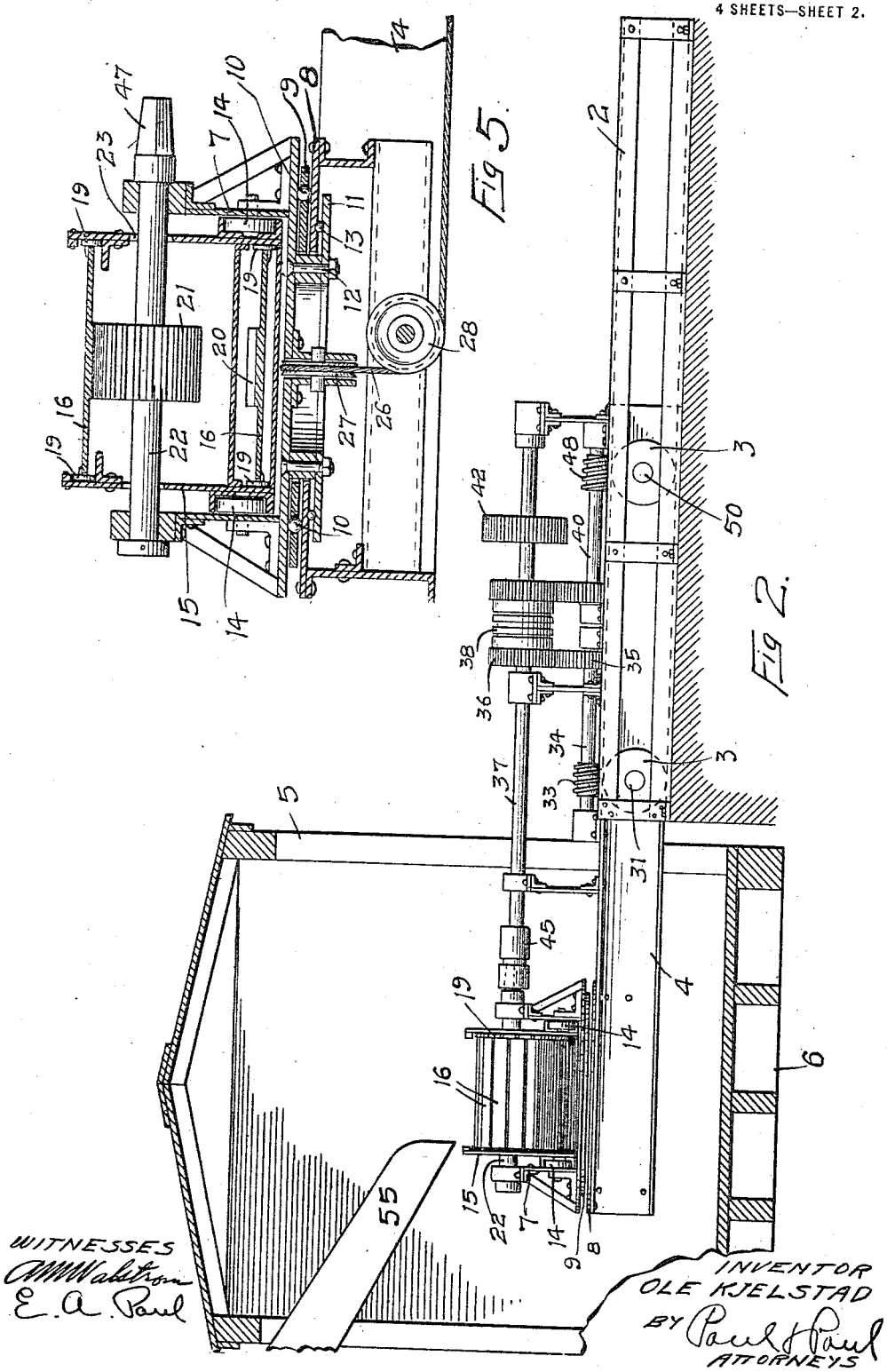

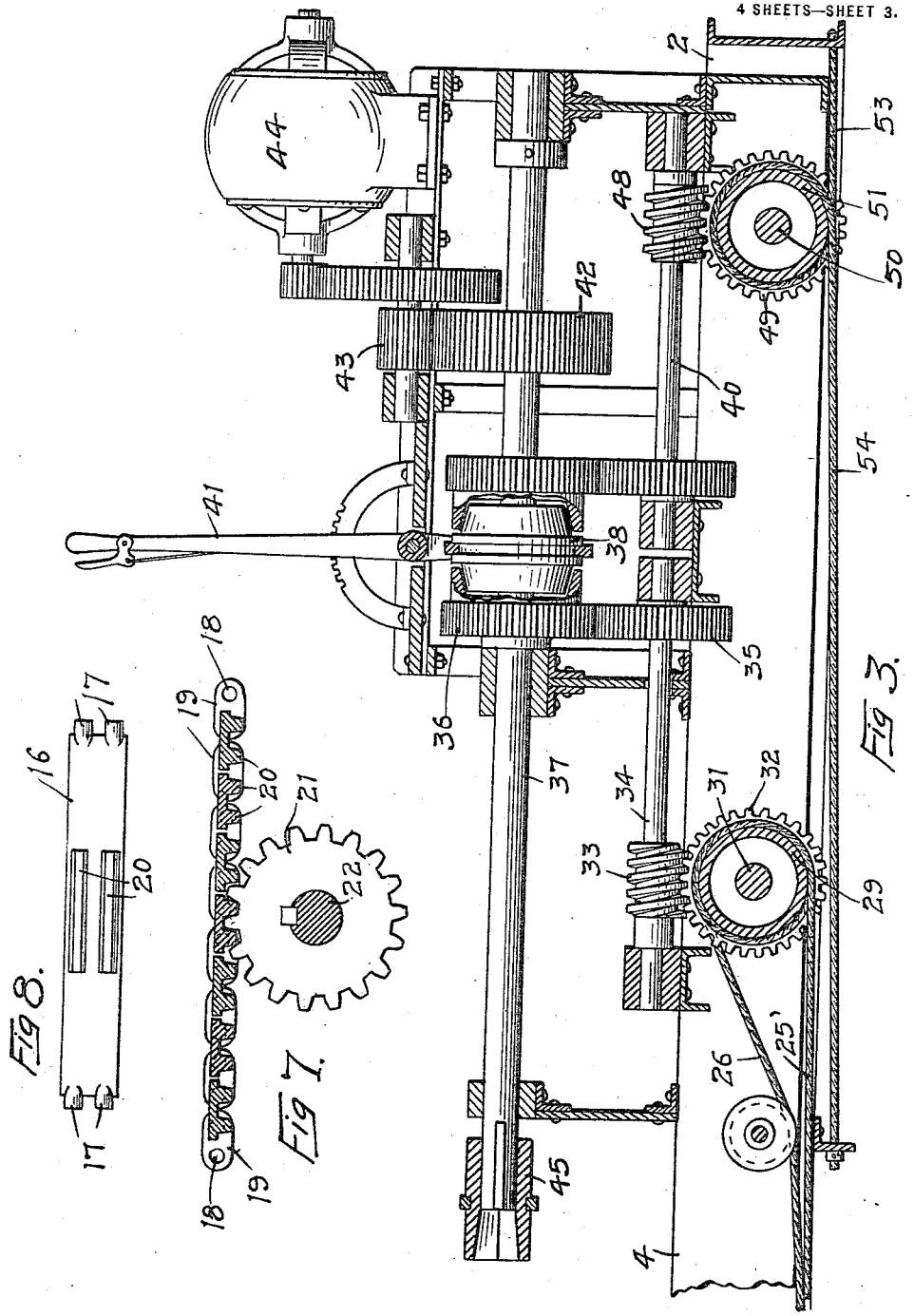

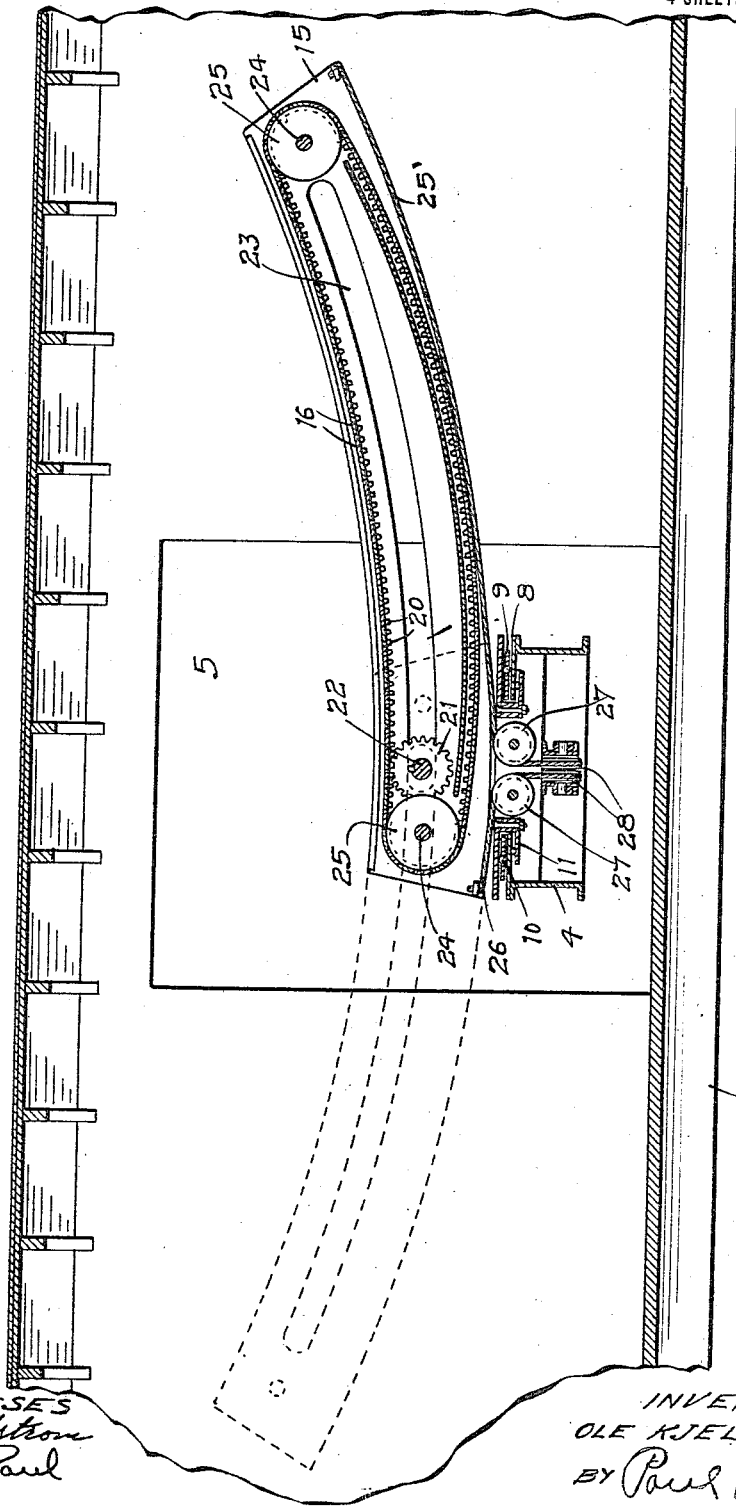

UNITED STATES PATENT OFFICE.

OLE KJELSTAD, OF WEST DULUTH, MINNESOTA.

CAR-LOADER.

1,265,673.  Specification of Letters Patent.  Patented May 7, 1918.

Application filed July 6, 1915.  Serial No. 38,329.

*To all whom it may concern:*

Be it known that I, OLE KJELSTAD, citizen of the United States, resident of West Duluth, county of St. Louis, State of Minnesota, have invented certain new and useful Improvements in Car-Loaders, of which the following is a specification.

My invention relates to mechanisms for loading box cars, being primarily designed for handling coal from hoppers or the like.

The object of the invention is to provide an apparatus of simple construction and hence easily operated and inexpensive to keep in repair, which will have a large capacity and may be adapted for all conditions of installation and be capable of handling coal with a minimum of breakage.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of my car loading apparatus, illustrated in position for work in a box car, Fig. 2 is a transverse sectional view of a box car, showing a side elevation of the loading apparatus, Fig. 3 is a detail sectional view, showing the preferred mechanism for operating the loader, Fig. 4 is a longitudinal section through a box car and through the loading belt mounted for operation therein, Fig. 5 is a detail sectional view of the turn table mechanism upon which the loading belt is mounted, Fig. 6 is a side elevation of the turn table and loading belt, Fig. 7 is a detail sectional view of a portion of the belt, Fig. 8 is a plan view of one of the links of the belt shown in an inverted position, In the drawing, 2 represents a stationary frame, preferably rectangular in form and having bearings for the supporting wheels 3 of a carriage 4 that is mounted for longitudinal movement in the frame 2. This carriage is designed to be projected into the side door opening 5 of a box car 6. At one end of this carriage I provide a turn-table device, consisting of a frame 7 having an anti-friction bearing on a plate 8 by means of a ring 9 and bearing balls 10. A ring 11 is secured to the said frame by bolts 12 and has bearing balls 13 on the underside of the plate 8 and in staggered relation with respect to the upper bearing balls. These bearings form a substantial support for the rotating frame and prevent it from tilting under the weight of the loading belt.

Mounted in the frame 7 are bearing wheels 14 for the belt frame 15 in which a loading belt is mounted. This belt preferably consists of plates 16 having pairs of pins 17 at each end to enter holes 18 in links 19. The middle portion of the plate 16 on the underside is provided with teeth 20 meshing with a gear wheel 21 on a shaft 22 which has bearings in the frame 7 and projects through longitudinal slots 23 in the belt frame. Shafts 24 are mounted in the belt frame and provided with rollers 25 around which the loading belt passes. This loading belt frame is preferably curved, as indicated, so that the discharge end will be nearer the top of the car and be out of contact with the material already delivered to the car.

Cables 25' and 26 are attached to the ends of the belt frame and pass over sheaves 27 and 28 to drums 29 and 30 on a shaft 31 that is mounted in the carriage 2. A worm gear 32 is preferably mounted on the shaft 31 and meshes with a worm 33 on a shaft 34 having a gear 35 which meshes with a gear 36 on a driving shaft 37 that is mounted in suitable bearings in the carriage 2. A double cone clutch 38 is preferably provided for connecting the driving shaft 37 with the loosely mounted gear 36 and operating the gear 35 and the shaft 34. A shaft 40 is preferably geared to the driving shaft 37 in a similar manner and is also controlled by the movement of the clutch. A suitable operating lever 41 is mounted in the carriage and operatively connected with the clutch 38. A gear 42 meshes with a pinion 43 that is geared to the shaft of a reversible motor 44, preferably electric, and the driving shaft 37 has a clutch 45 operated by a suitable lever 46 for engaging the squared end 47 of the shaft 22 for driving the loader belt. A worm 48 is mounted on the shaft 40 and meshes with a worm gear 49 on the shaft 50 on which drums 51 and 52 are secured. Cables 53 and 54 are attached respectively to these drums and are connected to the stationary frame for forward and backward movement of the carriage when the shaft 50 is revolved.

In the operation of the apparatus, the car to be loaded is moved to a point opposite the stationary frame, or the frame, if portable, may be moved to a point opposite the car door and the loader belt being swung to proper position, the carriage will be moved forward through the agency of the mechanism described until the frame projects into the car and the belt assumes the loading position therein under a suitable spout 55 or other loading means. When this has been done, the cone clutch will be set in a neutral position, arresting movement of the shaft 50 and through the clutch 45 the driving shaft 37 will be connected with the shaft 22 of the loading belt, whereupon the belt will be set in motion and the material deposited thereon from the spout 55 will be delivered at one end of the car, and as that end is gradually filled, the operator, through the clutch connections and the drum 29 and its cable, will cause the loader belt and frame to slowly recede or back away until, when the end of the car is filled, the loader will assume a loading position at the other end of the car, as indicated by full lines in Fig. 4. The direction of movement of the belt and the movement of the frame will then be reversed until the the belt and frame resume their former position, with both ends of the car filled. The belt frame is then turned and the carriage withdrawn until the loader is removed from the car, when the center of the car can be filled directly from the spout.

In various ways the details of construction herein shown and described may be modified and still be within the scope of my invention.

I claim as my invention:

1. A car loader comprising a carriage, a turn-table mounted thereon, a loader belt frame having slots therein for longitudinal movement on said turn table, a loader belt mounted in said loader frame, a driving means including a shaft projecting through said slots and having a driving connection with said belt and independently operable means connected with said driving means for moving said carriage and loader frame into a car and for moving said loader frame longitudinally on said turn-table during the feeding operation of said loader belt.

2. In a box car loader, a carriage, a turn-table mounted thereon, a loader belt frame having slots therein for longitudinal movement on said turn table, idle rolls mounted in said loader frame, a loader belt passing over said rolls, means for moving said loader frame longitudinally on said turn-table, and means including a shaft projecting through said slots and geared to said belt for feeding said belt during such longitudinal movement.

3. A box car loader comprising a carriage, a loader frame mounted thereon and provided with longitudinal slots therein, idle rollers mounted in said frame, a loader belt carried by said rollers, a shaft projecting through the slots in said frame and geared to said belt, means for driving said shaft to operate said belt, and means for moving said frame lengthwise with respect to said shaft.

4. A car loader comprising a carriage, a turn-table mounted thereon, a loader belt frame having anti-friction bearings on said turn-table for longitudinal movement thereon, a loader belt mounted in said loader frame, a shaft journaled in bearings on said turn-table between the upper and lower stretches of said belt and above the lower portion of said loader frame, and geared to said belt for driving the same, means for moving said loader frame back and forth on its bearings on said turn-table and for simultaneously driving said shaft to operate said belt.

In witness whereof, I have hereunto set my hand this 29th day of June, 1915.

OLE KJELSTAD.

Witnesses:
J. N. PEYTON,
V. W. SPRING.

Copies of this patent may be obtained for five cents each, by addressing the "Commissioner of Patents, Washington, D. C."